United States Patent [19]
Timtner

[11] 3,819,019
[45] June 25, 1974

[54] SPRAG FOR FREE-WHEELING CLUTCH

[75] Inventor: Karlheinz Timtner, Bad Homburg, Germany

[73] Assignee: Ringspann Albrecht Maurer KG, Bad Homburg, Germany

[22] Filed: Jan. 31, 1973

[21] Appl. No.: 328,243

[30] Foreign Application Priority Data
Jan. 31, 1972   Germany............................ 2204305

[52] U.S. Cl. .............................. 192/41 A, 192/45.1
[51] Int. Cl. ............................................ F16d 41/07
[58] Field of Search ......... 192/41 A, 45.1; 188/82.2

[56] References Cited
UNITED STATES PATENTS
1,694,377   12/1928   De Lavaud ...................... 192/41 A
2,901,072   8/1959   Maurer et al. ..................... 192/45.1
3,019,873   2/1962   Ferris et al. ........................ 192/45.1
3,743,066   7/1973   De Lavalette .................... 192/41 A

*Primary Examiner*—Allan D. Herrmann
*Attorney, Agent, or Firm*—Spencer & Kaye

[57] ABSTRACT

A free-wheeling clutch sprag which is given a smooth and gradual sprag angle variation in the minimum sprag height range by giving at least one of the sprag surfaces which contacts a race the form of an involute cylinder.

6 Claims, 7 Drawing Figures

PATENTED JUN 25 1974　　3,819,019

N  TRANSITION POINT OF THE TWO BASIC INVOLUTE CIRCLES
e  SECOND INVOLUTE CYLINDER SURFACE
a  FIRST INVOLUTE CYLINDER SURFACE

M  ORIGINATING POINT OF r, TRANSITION POINT OF THE BASIC INVOLUTE CIRCLES
c  SURFACE OF CIRCULAR CYLINDER OF RADIUS $r_i$
d  SECOND INVOLUTE CYLINDER SURFACE
a  FIRST INVOLUTE CYLINDER SURFACE

SPRAG FOR FREE-WHEELING CLUTCH

BACKGROUND OF THE INVENTION

The present invention relates to a sprag for a free-wheeling clutch. Generally, a sprag has two convex surfaces which contact the outer surface of an inner free-wheeling race and the inner surface of an outer free-wheeling race, respectively, along two parallel straight lines of contact. The sprag undergoes a tilting movement upon relative rotation between the inner and outer races corresponding to engagement and disengagement of the clutch. The angle ε between the plane through the two above-mentioned lines of contact and the plane through one of these lines of contact and the axis of rotation of the clutch is defined as the sprag angle and is to a certain extent dependent on the tilting movement of the sprag.

In this known type of free-wheeling clutch, one of the free-wheeling races is generally connected with a driving shaft or the like and the other race, which is arranged concentrically with the first race, is connected with a driven shaft or the like. Between these two races, there generally are a plurality of sprags which may be directly in contact with one another or may be spaced at equal intervals around the clutch periphery by means of a cage. The change in the height of the sprag in the radial direction during the tilting movement effects the engagement and disengagement of the clutch.

To initiate the engagement of the clutch, the sprags are usually pressed against the contact surfaces by the use of springs. Since the cause of the tilting movement is the frictional forces occurring between the sprag and the contact surfaces of the races, the direction of the tilting movement depends on the relative movement of the two contact surfaces with respect to one another. Relative movement in one direction leads to a tilting movement of the sprag which reduces its radial height and thus also decreases the effective frictional forces between the surfaces of the sprag and the surfaces of the races, i.e. it produces free-wheeling. While, the relative movement in the other direction leads to a tilting movement of the sprag which increases its radial height and thus also increases the frictional forces. In the latter situation, a jamming between the sprag and the two free-wheeling races will result when the forces become large enough, thereby causing the clutch to become force transmitting and a torque to be transmitted from the driving to the driven free-wheeling race. As the torque to be transmitted increases, so does the tilting movement of the sprag thereby causing the sprags to become more tightly jammed in between the races. Consequently, forces acting in a direction perpendicular to the contact surfaces are created. It, therefore, can be seen that along the lines of contact between the sprag surface and the contact surface of the races, peripheral forces are created due to the frictional forces acting on the sprag which thus subject the sprag to a tilting movement. Since this tilting movement causes the radial height of the sprag to increase, the normal forces are increased until these normal forces compensate for the peripheral forces which cause the tilting movement of the sprag.

It is known from practical experience that for secure engagement of the free-wheeling clutch during the transition from the free-wheeling to the tramsmission operation, the ratio of the peripheral force to the normal force at the sprag must not be greater than about 0.05. This value is dependent upon the oil film normally adhering to all of the parts. Once this oil film is penetrated by the sprags, this value might increase two or threefold. It is thus known to make this ratio of the peripheral force to the normal force variable in dependence on the load, i.e. in such a manner that the peripheral force occurring during engagement of the clutch produces a relatively high normal force which permits the sprag to penetrate the oil film. The coefficient of friction, therefore, suddenly increases when the oil film is penetrated so that in the subsequent tilt range of the sprag a normal force, which is less than the effective peripheral force at the beginning of the engagement of the clutch is sufficient to retain the clutch in an engaged position. The applicable ratio of the peripheral force to the normal force is equal to the tangent of the above-mentioned sprag angle ε, as will be explained in greater detail below.

Since the sprag angle increases in the tilting range between the engagement and the free-wheeling state, it, therefore, is possible to obtain a release of the sprag surfaces from the contact surfaces of the inner and outer races during free-wheeling while rotating the sprag through only a small twist angle. This desired rapid increase in the sprag angle on both sides of the coupling region can be obtained since one of the sprag surfaces is formed of a plurality of contiguous axially parallel cylindrical sections each of which has a different radius of curvature. Each of these cylindrical sections furnishes a special sprag angle curve in dependence on the radial height of the sprag so that optimum utilization of the friction conditions existing between the sprag surface and the contact surface is theoretically possible. Depending on the geometrical configuration of the sprag, a certain functional relationship is exhibited between the sprag angle and the radial height of the sprag, which relationship is referred to as the sprag angle curve.

The arrangement of adjoining cylinder sections constituting the sprag surface produce a sharp bend in the sprag angle curve, thus leading to a drawback in the utilization of these known sprags. Because of this sharp bend in the curve, only a small range of the sprag height or tilt angle is available in the engagement, or coupling, range of the sprag angle curve where the sprag angle is sufficiently small to assure definite penetration of the oil film on the part of the sprag. In practice, this narrow operating region cannot be maintained over the entire periphery of the free-wheeling races. Since radial displacements of the free-wheeling surfaces in the order of magnitude of about 1/10 mm can exist, the sprag height causes engagement of the clutch to occur only at certain points along the periphery. This results in an irregular distribution of the load, increased wear of the material and a reduction in the maximum level of transmissible torque. These same problems occur to a higher degree in clutches of the type disclosed in German Pat. No. 1,079,904 which have a periodically and continuously changing radial distance between the inner and outer contact surfaces in order to produce a more uniform wear on the sprag surface.

A flatter characteristic of the sprag angle curve in the engagement range could be obtained by further dividing the sprag surface into additional axially parallel cylindrical sections with corresponding finely graduated radii. Such a construction, however, would further increase the already high cost of production for the drawing dies for shaping the sprags.

SUMMARY OF THE INVENTION

An object of the present invention is to eliminate the above-mentioned drawbacks of prior known systems while keeping the shape of the sprag surface relatively simple so as to keep the cost of production down.

Another object of the present invention is to form a sprag which provides a relatively smooth sprag angle curve.

A further object of the present invention is to provide a sprag which furnishes a normal force in the engagement range which is sufficient for penetrating the lubricating oil film but which is not unnecessarily high. It is of special interest to provide a sprag exhibiting such characteristics particularly for a free-wheeling clutch where the radial distance between the outer and inner contact surfaces of the free-wheeling clutch is different at different points along its periphery. Moreover, the sprag angle should increase as rapidly as possible when a torque is created within the free-wheeling clutch, but without exceeding the coefficient of static friction so that the normal forces are kept as low as possible as compared to the peripheral forces. The height of the sprag also should substantially increase with a small twist angle so that elastic deformations of the free-wheeling races can be easily bridged. Moreover, the height of the sprags should decrease as rapidly as possible with a small twist angle when they are twisted in the disengaging direction after they have passed through the engagement range. Furthermore, the configuration of the sprags should be such that the drawing dies can be manufactured relatively easily.

This is accomplished in accordance with the present invention by forming at least one of the surfaces of the sprag which contacts a corresponding surface of one of the reces, as an involute cylinder, a circular involute profile being the most preferable shape due to its ease of fabrication. The use of an involute as provided by the present invention offers, as the extreme case of an infinite number of adjacent axially parallel circular cylinders of infinitely fine radius gradations, an ideally continuous course for the sprag surface curvature while keeping production expenses to a minimum. Consequently, the course of the sprag angle curve in the critical engagement range will be smoothed to such an extent that the minimum value of the sprag angle remains almost constant over a wide tilt range and the sprag angle continuously increases in the direction out of the engagement range for decreasing as well as for increasing radial sprag heights.

A displacement of the center or a change in radius of the basis circle of the involute produces any sprag angle curve characteristic which is desired. In special cases, however, the involute cylinder could be constructed of a combination of various basic circles, each having a different radius of curvature. These can then directly change from one to the other or can be connected together by a circular cylinder which has a tangent on the involute cylinders.

It is generally advantageous to only form the inner sprag surface of each sprag as an involute cylinder while the other surface of a circularly cylindrical profile whose axis of rotation passes through the center of gravity of the sprag. With such an arrangement the centrifugal forces, which become more significant at higher speeds of the free-wheeling clutch and, therefore, must be considered, will have no influence on the tilting movement of the sprag.

Furthermore, it has also been found to be advantageous, for functional reasons, for the circularly cylindrical outer sprag surface to be concentrically arranged with the circularly cylindrical lateral border surfaces of the sprag. These border surfaces may serve as contact surfaces to the adjacent sprags or also as guide surfaces in a cage.

DESCRIPTION OF THE PREFERRED EMBODIMENTS

Figure 1:
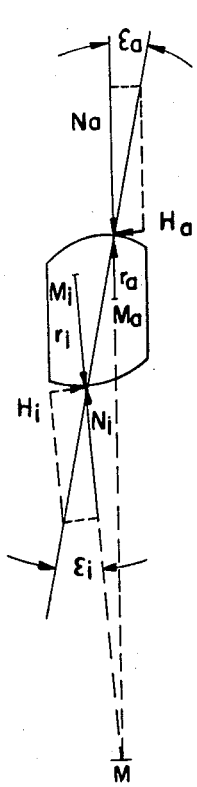
FIG. 1 shows a schematic representation of the forces which are created at the surfaces of a sprag during the transmission of torque.

FIG. 1 provides a schematic representation of the forces created at the surfaces of the sprag, not including the weight of the sprag, the resetting force generally produced by a spring and the centrifugal force occurring during rotation. Vectors $H_a$, $H_i$ indicate the friction-dependent peripheral forces produced along the outer and inner sprag surfaces, respectively. The vectors of the normal forces which are produced in a direction perpendicular to the sprag surface are identified as $N_a$ at the outer sprag surface and $N_i$ at the inner sprag surface. The axis of rotation of the clutch, which is not shown in detail, coincides with the cylindrical axis of the outer and inner race contact surfaces and passes through point M. Points $M_a$ and $M_i$ are the axes of the circularly cylindrical outer and inner sprag surfaces.

A condition for the equilibrium of the sprag shown in FIG. 1 is that the resulting forces of the combination of $N_a$ and $H_a$ and of $N_i$ and $H_i$ must lie along the same line and must be of equal magnitude and opposite directions. Consequently, the following relationships are established: $H_a/N_a = \tan \epsilon_a$  $H_i/N_i = \tan \epsilon_i$ where $\epsilon_a$ and $\epsilon_i$ are the sprag angles at the outer and inner races, respectively.

The tangent of the earlier defined sprag angle thus indicates the ratio of peripheral force to normal force. Since this angle is relatively small, this ratio can be approximated by the sprag angle measured in radians. If the sprag angle is small then even low peripheral forces will produce a relatively high normal force. Such a result is desirable during engagement of the clutch so that all of the sprags will safely penetrate the oil film disposed between the contact surfaces and the sprag surfaces and the resulting high coefficient of friction can be effectively utilized. With a higher sprag angle, however, the peripheral forces produce much smaller normal forces. This situation is desired under higher load conditions in order to keep the Hertz stress at the sprag surfaces as low as possible. It will be realized that the Hertz stress is the compressive stress in arched bodies pressed onto each other without simultaneous shear. The sprag angle, however, must always remain below the maximum possible friction angle otherwise the clutch would slip through.

Figure 2:
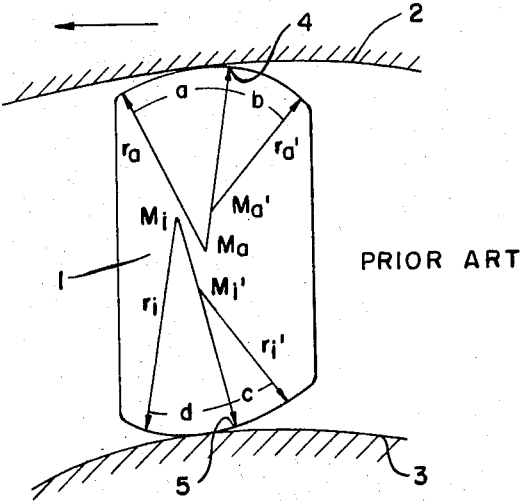
FIG. 2 shows the wo races of a clutch with a known sprag, having each of its surfaces formed of a combination of two cylindrical sections, between the two races.

Due to these interrelationships, sprags are known whose sprag angle varies in dependence on the radial sprag height. Such a sprag is shown in FIG. 2. Sprag 1 rests with its surfaces $a$, $b$, $c$, $d$ between the inner contact surface of an outer free-wheeling race 2 and the outer contact surface of an inner free-wheeling race 3. When the outer race 2 is rotated in the direction illustrated by the arrow, the sprag 1 is subjected to a tilting movement so as to increase the radial height of the sprag as the sprag angle increases in accordance with a path as illustrated by the course of line 7–9 of FIG. 3. The sprag angle here slowly approaches the value of the coefficient of friction and if this value is exceeded then the clutch will slip through. In order to prevent this, a sprag surface $b$ with a reduced cylinder radius $r_a'$ follows the sprag surface $a$, which has a larger cylinder radius $r_a$, of sprag 1. As soon as this sprag surface $b$ comes in contact with outer race 2, the sprag angle curve will flatten out as illustrated by line 9–10 in FIG. 3. Point 4 of the surface of sprag 1 corresponds to point 9 of the sprag angle curve.

When the outer race 2 is rotated in a direction opposite to the direction of the arrow, sprag 1 is tilted so as to cause the radial height of the sprag to decrease until the sprag surfaces more or less loosely slide along the contact surfaces of the outer and inner races in the free-wheeling state. Corresponding to the decreasing radial sprag height, the sprag angle curve follows the path shown in FIG. 3. Toward the end of the tilting movement, sprag surface $c$ which has a reduced cylinder radius $r_i'$ as compared to radius $r_i$ of the adjacent cylinder surface $d$ comes into contact with the inner race 3. Due to the reduction in radius at the inner sprag surface, the characteristic of the sprag angle curve changes in such a way that the sprag angle strongly increases in spite of the decreasing radial height of the sprag, as illustrated by line 7–6 in FIG. 3. The minimum value of the sprag angle, at point 7 in FIG. 3, is obtained when the contact line of the inner sprag surface along inner race 3 passes through point 5.

As can be seen from FIG. 3, the height of the sprags must be within a specific narrow range during the clutch engagement process in order that the coefficient of friction level which must be present for the transmission of torque remains below the actual coefficient of friction, which is initially very low due to the oil film. In practice, the range of fluctuation of the sprag height, illustrated in FIG. 3 as the clutch engagement range, cannot be maintained over the entire periphery of the annular area of the clutch since radial displacements of the surfaces of the order of magnitude of about 1/10 mm are sufficient to flip the sprags affected by this displacement out of the required engagement. When a torque is then created within the clutch, these sprags are no longer able to penetrate the lubricating film disposed between the surface of the race and the sprag surface to reach the range of the dry coefficient of friction. Under such conditions these sprags cannot be effectively utilized for the transmission of torque.

Figure 3:
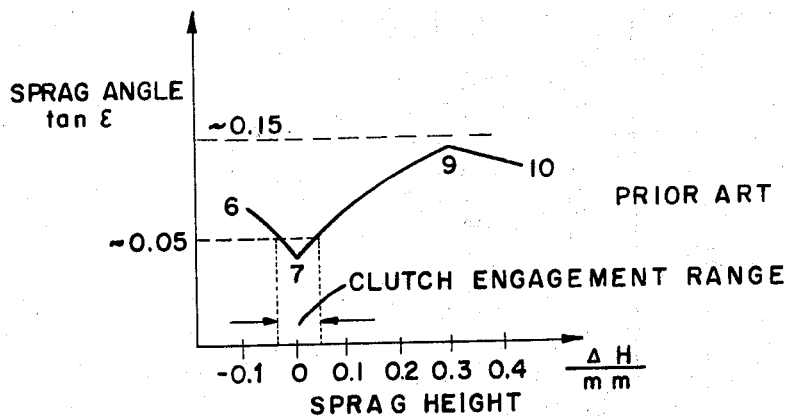
FIG. 3 is a plot of the sprag angle curve of the sprag of FIG. 2.
Figure 5:
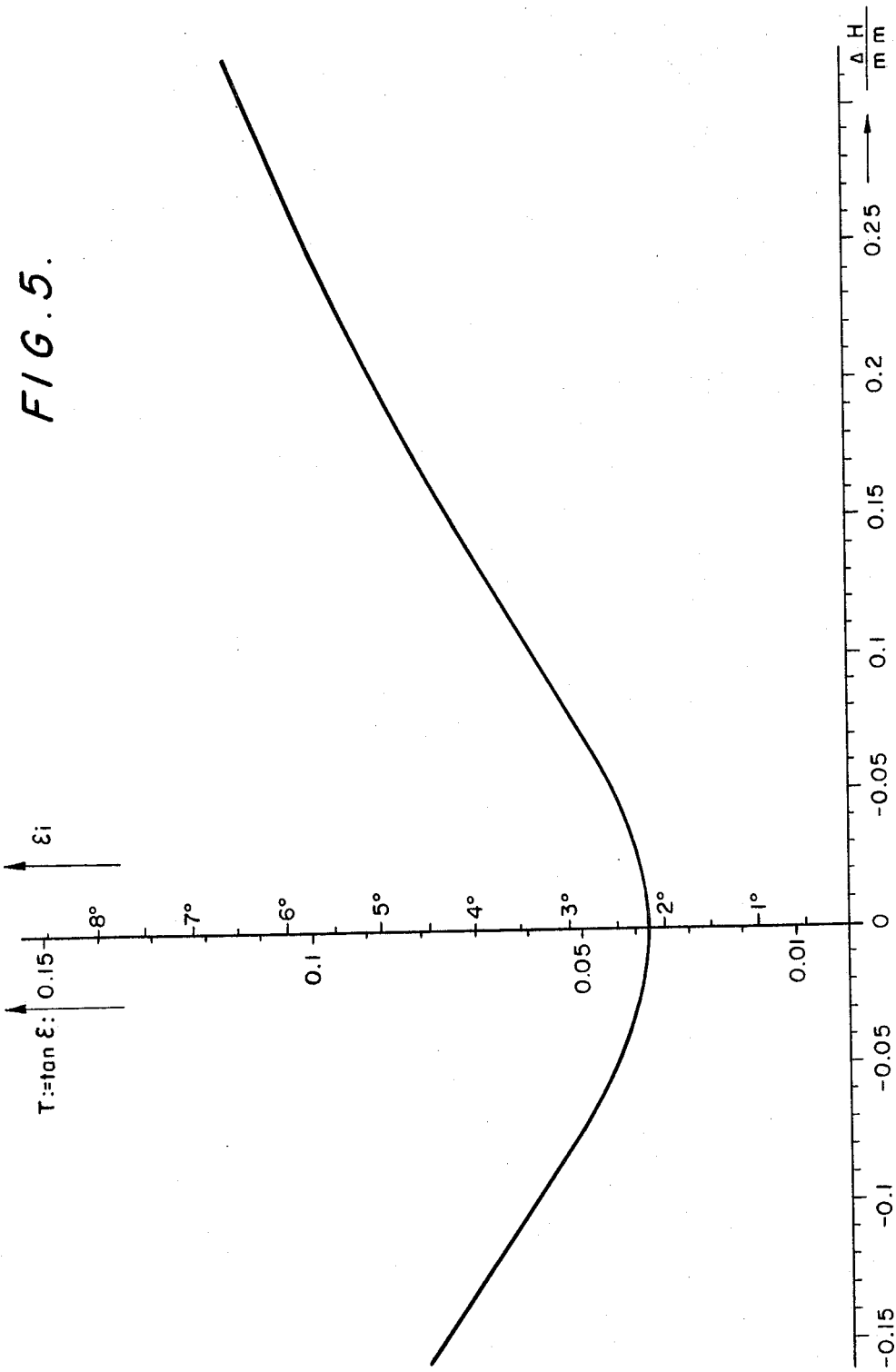
FIG. 5 is a plot of the sprag angle curve of the sprag shown in FIG. 4.

It is to be noted that both in FIG. 3 and in FIG. 5 the sprag height variation, in mm, is indicated along the abscissa.

Figure 4:
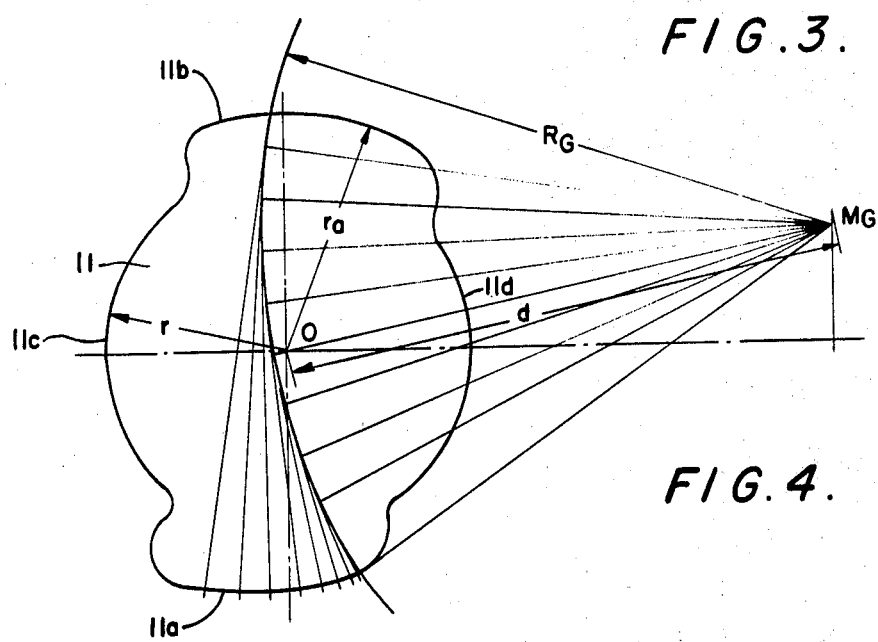
FIG. 4 is a pictorial view of a sprag, according to the present invention, having the form of an involute cylinder with a circular involute profile.

FIG. 4 shows a sprag 11 according to the present invention with one surface 11a being in the form of an involute circular cylinder. The other surface 11b of sprag 11 has the form of a circular cylinder. With respect to the involute surface 11a, the basic circle on which the generatrix is developed has a radius $R_G$. The center $M_G$ of the basis circle lies above the horizontal central axis of the sprag 11 and is arranged so that the basic circle encloses the center O of the circular cylindrical sprag surface 11b. The center O is simultaneously also the center of the two circularly cylindrical lateral border surfaces 11c and 11d. Of course numerous variations are possible regarding the arrangement of the basic circuit with respect to the placement of its center $M_G$ as well as with respect to the dimensions of its radius $R_G$. There also exists the possibility of providing an ellipse or similar curve instead of the basic circle on which the generatrix is developed. However, the technology required to reproduce the sprag with a surface having the form of an involute circle is substantially simpler since the required phases of movement are well known from the gear art.

The sprag angle curve associated with the sprag 11 is illustrated in FIG. 5. In contrast to the sprag angle curve shown in FIG. 3, this curve smoothly varies over the entire sprag height and, therefore, is free of any kinks or bends such as exhibited by the spray 1 of FIG. 2. Consequently, the stresses which occur during the tilting movement of the sprag also vary uniformly and, therefore, as a result the life of the clutches provided with the sprags, according to the present invention, is increased. Furthermore, FIG. 5 clearly shows that the involute profile of the sprag 11, according to the present invention, offers a relatively wide coupling range which assures that all of the sprags associated with the clutch penetrate the lubricating oil film disposed between the sprag surface and the race surface, even if the annular gap, as shown in the German Pat. No. 1,079,904, has a periodically and continuously changing radial width or if manufacturing inaccuracies produce radial displacements of the two coupling races.

As shown in FIG. 5, outside of the coupling range the sprag angle curve increases in the desired manner as in the sprag angle curve exhibited by prior known sprags. The sprag constructed in accordance with the present invention, however, provides a sprag angle curve which establishes an improved coupling range. In a sprag designed in accordance with FIG. 4, the following data were realized: $R_G = 15$ mm; $r_a = 6$ mm; $d = 14.55$ mm; $M_G$ was 2.9 mm above the horizontal central axis of the sprag 11.

Figure 6:
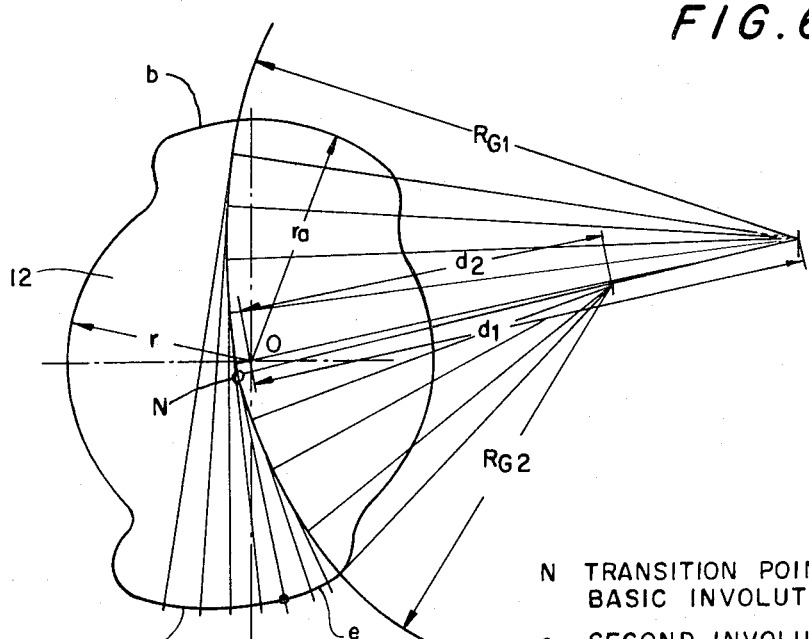
FIGS. 6 and 7 are pictorial views, similar to FIG. 4, of modified sprags according to the invention.

FIG. 6 shows in a pictorial view similar to FIG. 4 a sprag 12 having an involute cylinder composed of involutes of different basic circles with radii $R_{G1}$ and $R_{G2}$, respectively. These circles enclose the center O, and their centers lie above the horizontal axis of sprag 12 on a common line extending from the center O at distances $d_1$ and $d_2$ thereto, respectively.

Figure 7:
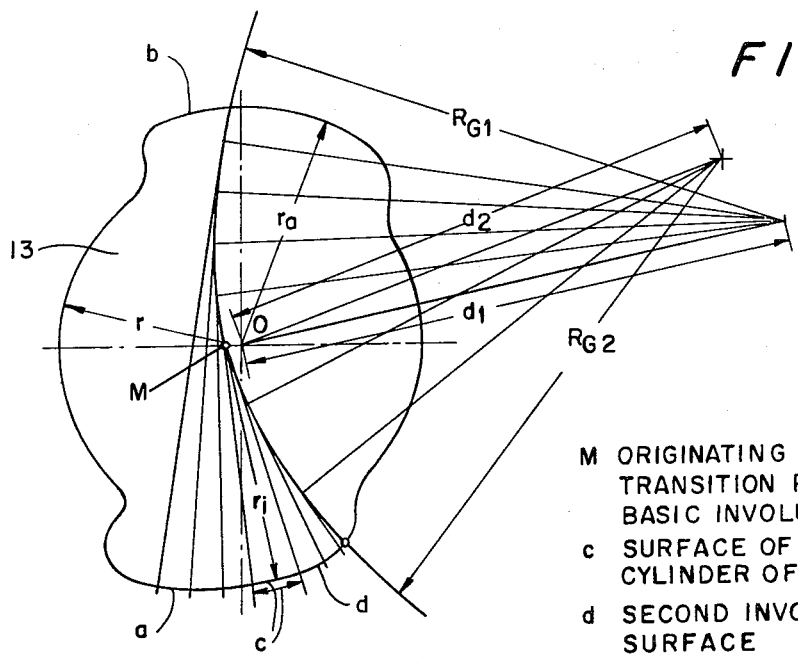

Finally FIG. 7 displays a sprag 13 similar to the one of FIG. 6, i.e. having two basic circles with radii $R_{G1}$ and $R_{G2}$, respectively. In this embodiment, however, a circular cylinder $c$ of radius $r_i$ is tangent to each of these two basic circles thus interconnected whose centers are, moreover, at different distances above the horizontal axis of sprag 13.

It will be understood that the above description of the present invention is susceptible to various modifications, changes and adaptions, and the same are intended to be comprehended within the meaning and range of equivalents of the appended claims.

I claim:

1. For use in a free-wheeling clutch having inner and outer free-wheeling races arranged to rotate about the clutch axis, a sprag having first and second convex sprag surfaces for contacting the outer surface of the inner free-wheeling race and the inner surface of the outer free-wheeling race, respectively, along two parallel lines of contact and for undergoing a tilting movement during relative rotation between the inner and outer races, corresponding to engagement and disengagement of the clutch, the two parallel lines of contact defining a first plane and one of the lines of contact and the axis of rotation of the clutch, defining a second plane, with the two planes enclosing an angle whose value is dependent on the tilting movement of the sprag, the improvement wherein at least one of said sprag surfaces has the form of an involute cylinder.

2. A sprag as defined in claim 1 wherein said involute cylinder has a circular involute profile.

3. A sprag as defined in claim 1 wherein the other of said sprag surfaces has the form of a section of a circular cylinder having an axis passing through the center of gravity of said sprag.

4. A sprag as defined in claim 3 wherein said sprag has, between said first and second convex surfaces, lateral border surfaces having the form of circular cylinders and said other sprag surface is arranged concentrically with said circularly cylindrical lateral border surfaces of said sprag.

5. A sprag as defined in claim 1 wherein said involute cylinder is formed by the involutes of a plurality of circles each having a different radius of curvature.

6. A sprag as defined in claim 5 wherein the involutes of the plurality of circles are arranged so as to be interconnected by a circular cylinder tangent to such involutes.

* * * * *